(12) United States Patent
Yeh

(10) Patent No.: US 7,540,093 B1
(45) Date of Patent: Jun. 2, 2009

(54) GARDENING SHEARS

(75) Inventor: Chun-Chiao Yeh, Changhua (TW)

(73) Assignee: Chung Cheng Scissors Co., Changhua Hsien (TW)

( * ) Notice: Subject to any disclaimer, the term of this patent is extended or adjusted under 35 U.S.C. 154(b) by 309 days.

(21) Appl. No.: 11/523,838

(22) Filed: Sep. 20, 2006

(51) Int. Cl.
*B26B 13/26* (2006.01)

(52) U.S. Cl. .............................. 30/244; 30/245; 30/257; 30/296.1; 30/298

(58) Field of Classification Search .................... 30/231, 30/244–246, 249–251, 254, 257, 296.1, 298; 56/239–241; D8/4, 5
See application file for complete search history.

(56) References Cited

U.S. PATENT DOCUMENTS

| | | | | | |
|---|---|---|---|---|---|
| 646,048 | A | * | 3/1900 | Donzella | 30/251 |
| 911,073 | A | * | 2/1909 | Rober | 56/240 |
| 1,135,989 | A | * | 4/1915 | Breach | 30/248 |
| 1,741,172 | A | * | 12/1929 | Huxman | 30/248 |
| 1,799,624 | A | * | 4/1931 | Goodwin | 30/251 |
| 1,800,081 | A | * | 4/1931 | Kishell | 56/240 |
| 1,823,199 | A | * | 9/1931 | Huxman | 30/248 |
| 2,777,196 | A | * | 1/1957 | Zoetemelk | 30/248 |
| 2,931,158 | A | * | 4/1960 | Keiser, Jr. | 56/241 |
| 2,957,297 | A | * | 10/1960 | Zoetemelk | 56/240 |
| 2,993,275 | A | * | 7/1961 | Naito | 30/250 |
| 3,007,245 | A | * | 11/1961 | Keiser, Jr. | 30/248 |
| 3,039,190 | A | * | 6/1962 | Wallace | 30/248 |
| 3,375,581 | A | * | 4/1968 | Knight | 30/248 |
| 3,384,962 | A | * | 5/1968 | Duffy et al. | 30/248 |
| 4,739,556 | A | * | 4/1988 | Orthey | 30/248 |
| 5,084,975 | A | * | 2/1992 | Melter | 30/249 |
| 6,339,884 | B1 | * | 1/2002 | Liu | 30/248 |
| D473,764 | S | * | 4/2003 | Wu | D8/5 |
| 6,571,479 | B1 | * | 6/2003 | Wu | 30/248 |
| 6,748,663 | B2 | * | 6/2004 | Linden | 30/249 |
| 6,938,347 | B2 | * | 9/2005 | Linden et al. | 30/251 |
| 7,275,323 | B2 | * | 10/2007 | Yang | 30/244 |
| 2003/0145470 | A1 | * | 8/2003 | Huang | 30/249 |
| 2004/0194320 | A1 | * | 10/2004 | Hsieh | 30/250 |

* cited by examiner

*Primary Examiner*—Jason Daniel Prone
(74) *Attorney, Agent, or Firm*—Alan Kamrath; Kamrath & Associates PA

(57) ABSTRACT

A pair of gardening shears include a handle, a drive member, a control lever, a transmission device, and two cutting blades. The transmission device includes a housing, a pivot plate, a catch plate, a link, a catch flange, a restoring member. Thus, the restoring member is biased between the catch flange and the catch plate, so that the restoring member is not subjected to a pulling force to prevent the restoring member from being worn out by a pulling force during a long-term utilization. In addition, when the pivot head of the handle is rotatable relative to the housing, the stop post of the pivot head is movable to rest on the pivot plate to prevent the pivot plate from directly rubbing the inner wall of the pivot head.

19 Claims, 11 Drawing Sheets

GARDENING SHEARS

BACKGROUND OF THE INVENTION

1. Field of the Invention

The present invention relates to a pair of shears and, more particularly, to a pair of gardening shears.

2. Description of the Related Art

A pair of conventional gardening shears in accordance with the prior art shown in FIGS. 10 and 11 comprises a handle (not shown) having a lower end provided with a pivot head 42, a drive member 47 mounted in the handle, a control lever (not shown) pivotally mounted on an upper end of the handle and connected to an upper end of the drive member 47 to drive the drive member 47, a transmission device 40 mounted on the pivot head 42 of the handle and connected to a lower end of the drive member 47, and two cutting blades 41 pivotally mounted on the transmission device 40 and driven by the drive member 47 via the transmission device 40.

The transmission device 40 includes a housing 48 on which the pivot head 42 of the handle is pivotally mounted, a pivot plate 46 mounted in the housing 48 and having a first end pivotally mounted on the lower end of the drive member 47 to move therewith, a connecting plate 45 having a first end pivotally mounted on a second end of the pivot plate 46 to move therewith, a link 43 movably mounted in the housing 48 and having a first end pivotally mounted on a second end of the connecting plate 45 to move therewith and a second end protruded outwardly from the housing 48 and pivotally mounted on one of the cutting blades 41 to open or close the cutting blades 41, and a restoring member 44 mounted in the housing 48 and biased between the link 43 and the housing 48. The second end of the pivot plate 46 is formed with a guide slot 461, and the first end of the connecting plate 45 is slidable in the guide slot 461 of the pivot plate 46.

In operation, when the control lever is pressed, the drive member 47 is pulled upward to pull the pivot plate 46 and the connecting plate 45 to pull the link 43 backward to move one of the cutting blades 41 so as to close the cutting blades 41. At this time, the restoring member 44 is pulled and compressed by the backward movement of the link 43 to store a restoring force. After the force applied on the control lever is removed, the link 43 is moved forward by the restoring force of the restoring member 44 to return to the original state to move one of the cutting blades 41 so as to open the cutting blades 41 again.

However, the restoring member 44 is pulled and compressed by the link 43, so that the restoring member 44 is subjected to a pulling force constantly and is easily worn out by the pulling force during a long-term utilization, thereby decreasing the lifetime of the restoring member 44. In addition, when the pivot head 42 of the handle is rotatable relative to the housing 48, the pivot plate 46 touches and directly rubs the inner wall of the pivot head 42, so that the pivot plate 46 is easily worn out by the friction during a long-term utilization, thereby decreasing the lifetime of the pivot plate 46.

BRIEF SUMMARY OF THE INVENTION

The primary objective of the present invention is to provide a pair of gardening shears having a longer lifetime.

Another objective of the present invention is to provide a pair of gardening shears, wherein the restoring member is biased between the catch flange and the catch plate, so that the restoring member is not subjected to a pulling force to prevent the restoring member from being worn out by a pulling force during a long-term utilization, thereby enhancing the lifetime of the restoring member.

A further objective of the present invention is to provide a pair of gardening shears, wherein when the pivot head of the handle is rotatable relative to the housing, the stop post of the pivot head is movable to rest on the pivot plate to prevent the pivot plate from directly rubbing the inner wall of the pivot head.

A further objective of the present invention is to provide a pair of gardening shears, wherein a user only needs to press the press button so as to adjust the angle between the pivot head of the handle and the housing, thereby facilitating the user adjusting the inclined angle of the pivot head of the handle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
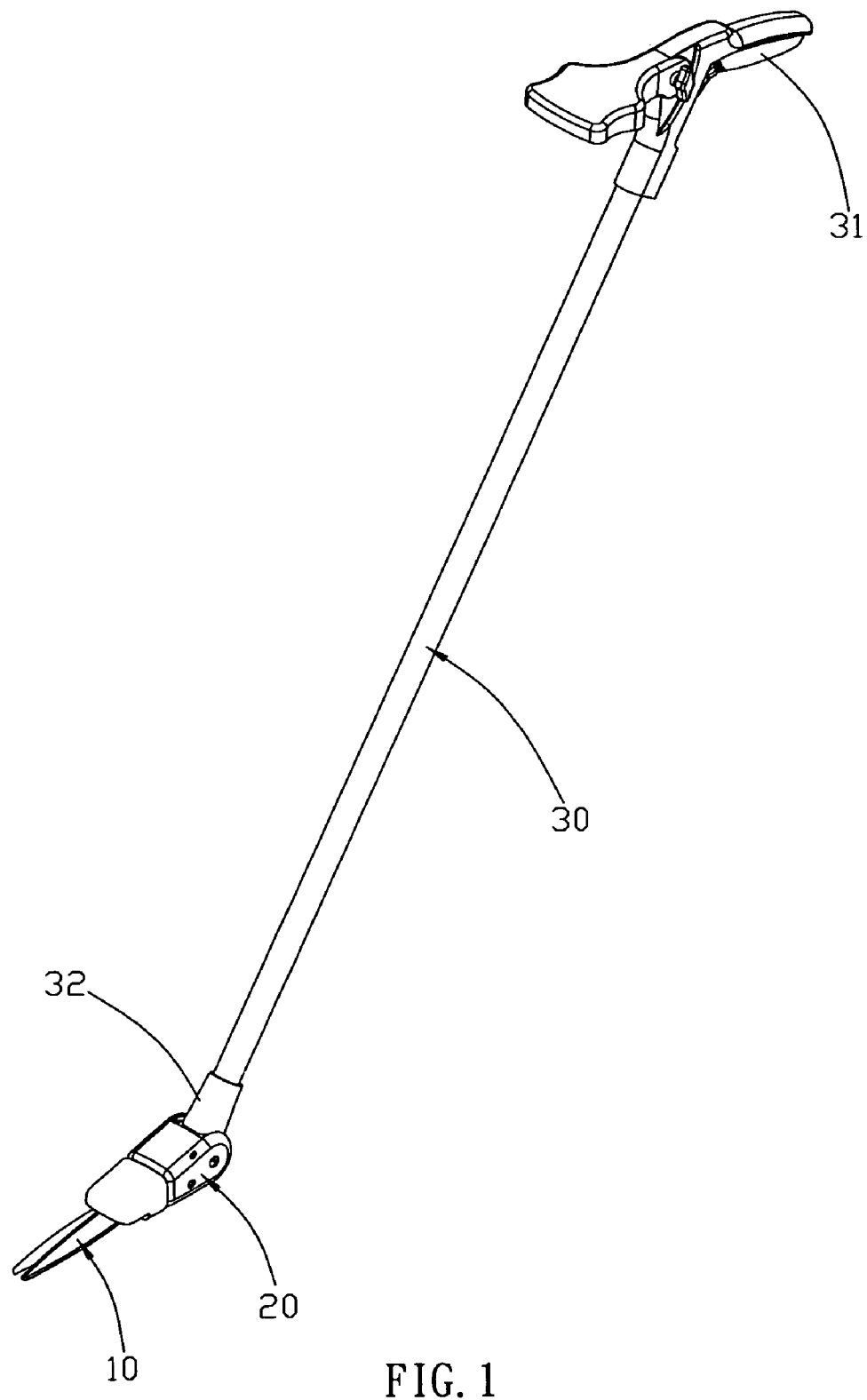
FIG. 1 is a perspective view of a pair of gardening shears in accordance with the preferred embodiment of the present invention.
Figure 2:
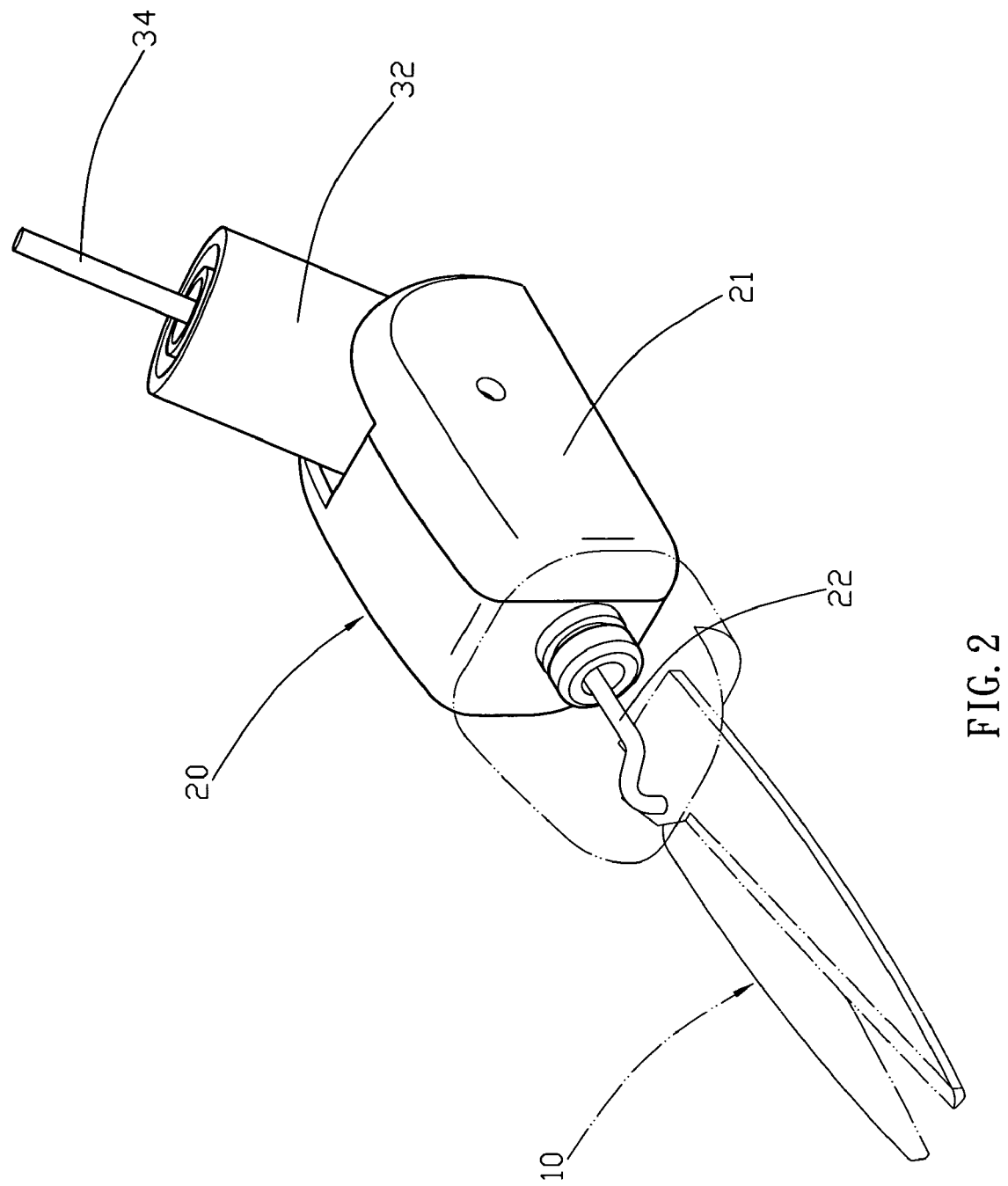
FIG. 2 is a locally enlarged view of the gardening shears as shown in FIG. 1.
Figure 3:
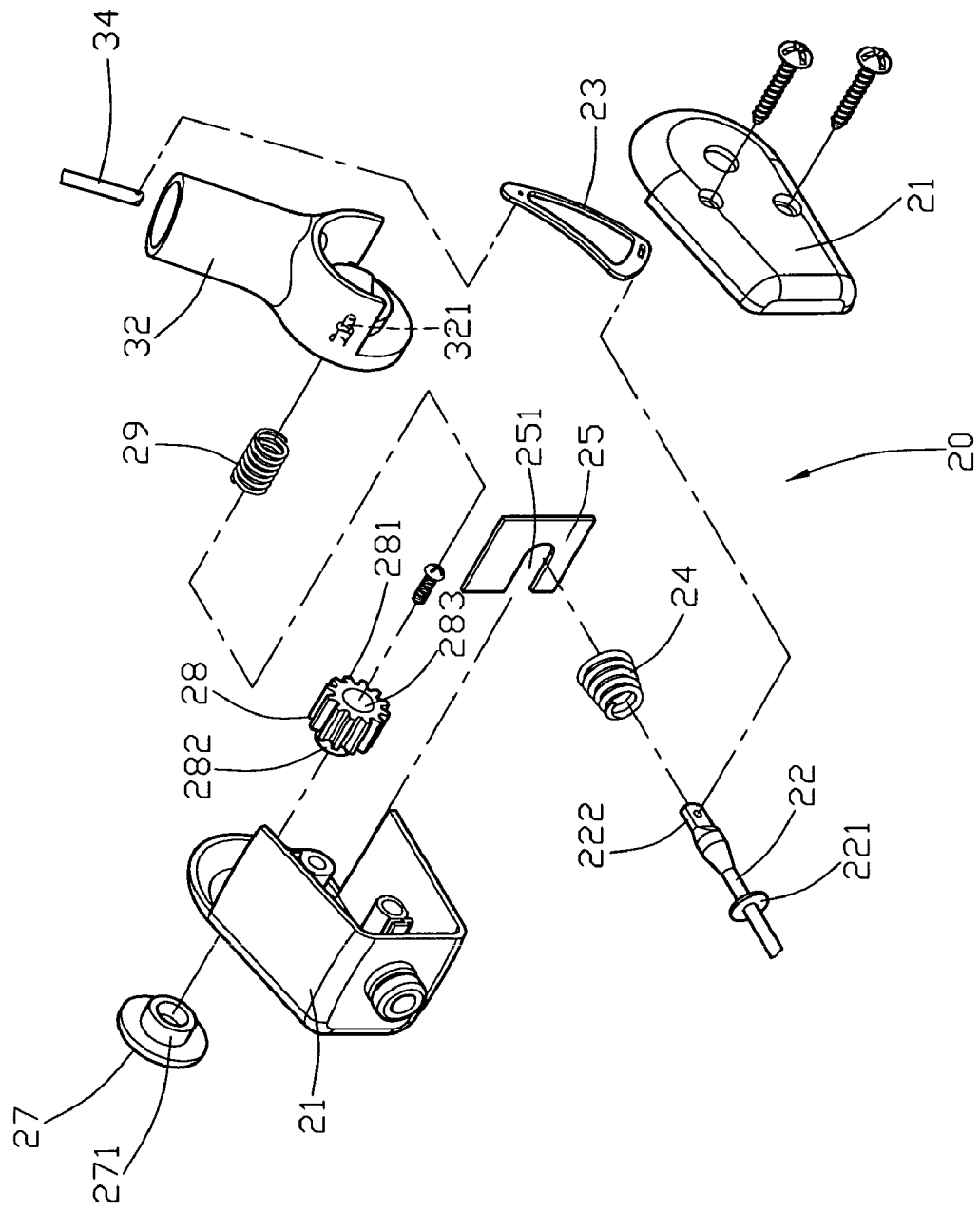
FIG. 3 is a partially exploded perspective view of the gardening shears as shown in FIG. 2.
Figure 4:
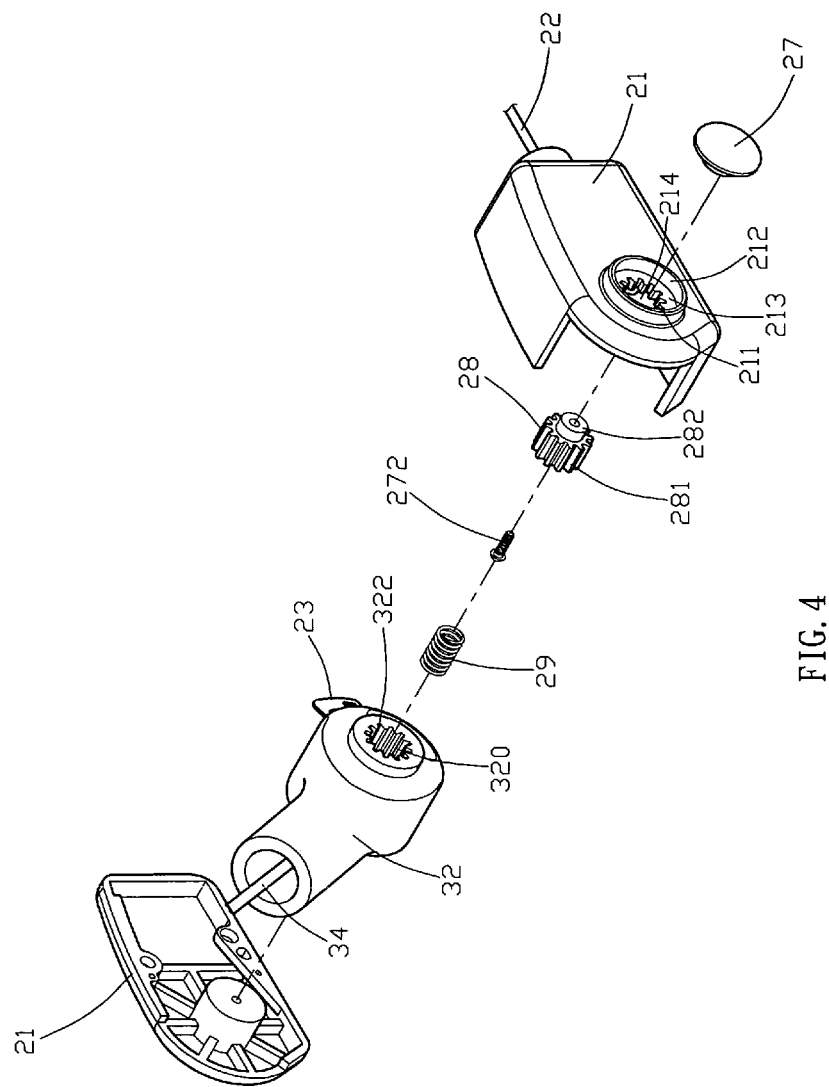
FIG. 4 is a partially exploded perspective view of the gardening shears as shown in FIG. 2.

Referring to the drawings and initially to FIGS. 1-6, a pair of gardening shears in accordance with the preferred embodiment of the present invention comprises a handle 30 having a lower end provided with a pivot head 32, a drive member 34 mounted in the handle 30, a control lever 31 pivotally mounted on an upper end of the handle 30 and connected to an upper end of the drive member 34 to drive the drive member 34, a transmission device 20 mounted on the pivot head 32 of the handle 30 and connected to a lower end of the drive member 34, and two cutting blades 10 pivotally mounted on the transmission device 20 and driven by the drive member 34 via the transmission device 20.

The transmission device 20 includes a housing 21 on which the pivot head 32 of the handle 30 is pivotally mounted, a pivot plate 23 mounted in the housing 21 and having a first end pivotally mounted on the lower end of the drive member 34 to move therewith, a catch plate 25 mounted in the housing 21, a link 22 movably mounted in the housing 21 and having a first end 222 pivotally mounted on a second end of the pivot plate 23 to move therewith and a second end protruded outwardly from the housing 21 and pivotally mounted on one of the cutting blades 10 to open or close the cutting blades 10, a catch flange 221 mounted on the link 22, and a restoring member 24 mounted on the link 22 and biased between the catch flange 221 and the catch plate 25.

The catch plate 25 is located between the catch flange 221 and the pivot plate 23 and has an inside formed with an opening 251 to allow passage of the first end 222 of the link 22.

The restoring member 24 pushes the link 22 to move toward the cutting blades 10 and away from the pivot plate 23.

The pivot head 32 of the handle 30 is located at a first end of the housing 21 and has an inner wall provided with a protruding stop post 321 and an outer wall provided with a receiving recess 320 having a periphery formed with a plurality of tooth-shaped locking grooves 322.

The pivot plate 23 is pivotally mounted in the pivot head 32 of the handle 30 and is movable to rest on the stop post 321 of the pivot head 32.

The cutting blades 10 are located at a second end of the housing 21.

The housing 21 includes two shells combined with each other. The housing 21 has a side wall formed with a receiving hole 214 having a periphery formed with a plurality of tooth-shaped locking slots 211. The receiving hole 214 of the housing 21 has a stepped shape and has an inner side formed with the locking slots 211 and an outer side formed with a radially and inwardly extending annular stop flange 213. The side wall of the housing 21 has an outer side formed with an outwardly extending annular enclosure 212 surrounding the locking slots 211.

The transmission device 20 further includes a locking member 28 movably mounted between the pivot head 32 of the handle 30 and the housing 21 and having a periphery formed with a plurality of locking teeth 281 which are locked in the locking grooves 322 of the pivot head 32 and are detachably locked in the locking slots 211 of the housing 21 to lock the pivot head 32 onto the housing 21, an elastic member 29 mounted between the pivot head 32 of the handle 30 and the locking member 28 to push the locking member 28 toward the locking slots 211 of the housing 21, and a press button 27 movably mounted on the housing 21 and connected to the locking member 28 to push the locking member 28 to detach from the locking slots 211 of the housing 21.

The locking member 28 is received in the receiving hole 214 of the housing 21 and stopped by the stop flange 213 of the housing 21. The locking member 28 has a first side formed with a receiving chamber 283 to receive the elastic member 29 which is partially received in the receiving recess 320 of the pivot head 32 and a second side formed with a protruding mounting post 282 protruded outwardly from the receiving hole 214 of the housing 21.

The press button 27 is movably mounted in the enclosure 212 of the housing 21 and has a side formed with a protruding mounting sleeve 271 mounted on the mounting post 282 of the locking member 28 and movable in the receiving hole 214 of the housing 21. The press button 27 and the locking member 28 are pushed by the elastic member 29 to move outwardly relative to the housing 21 so that the locking teeth 281 of the locking member 28 is locked in the locking slots 211 of the housing 21 at a normal state.

The transmission device 20 further includes a locking screw 272 extended through the receiving chamber 283 and the mounting post 282 of the locking member 28 and screwed into the press button 27 to attach the press button 27 onto the locking member 28.

Figure 5:
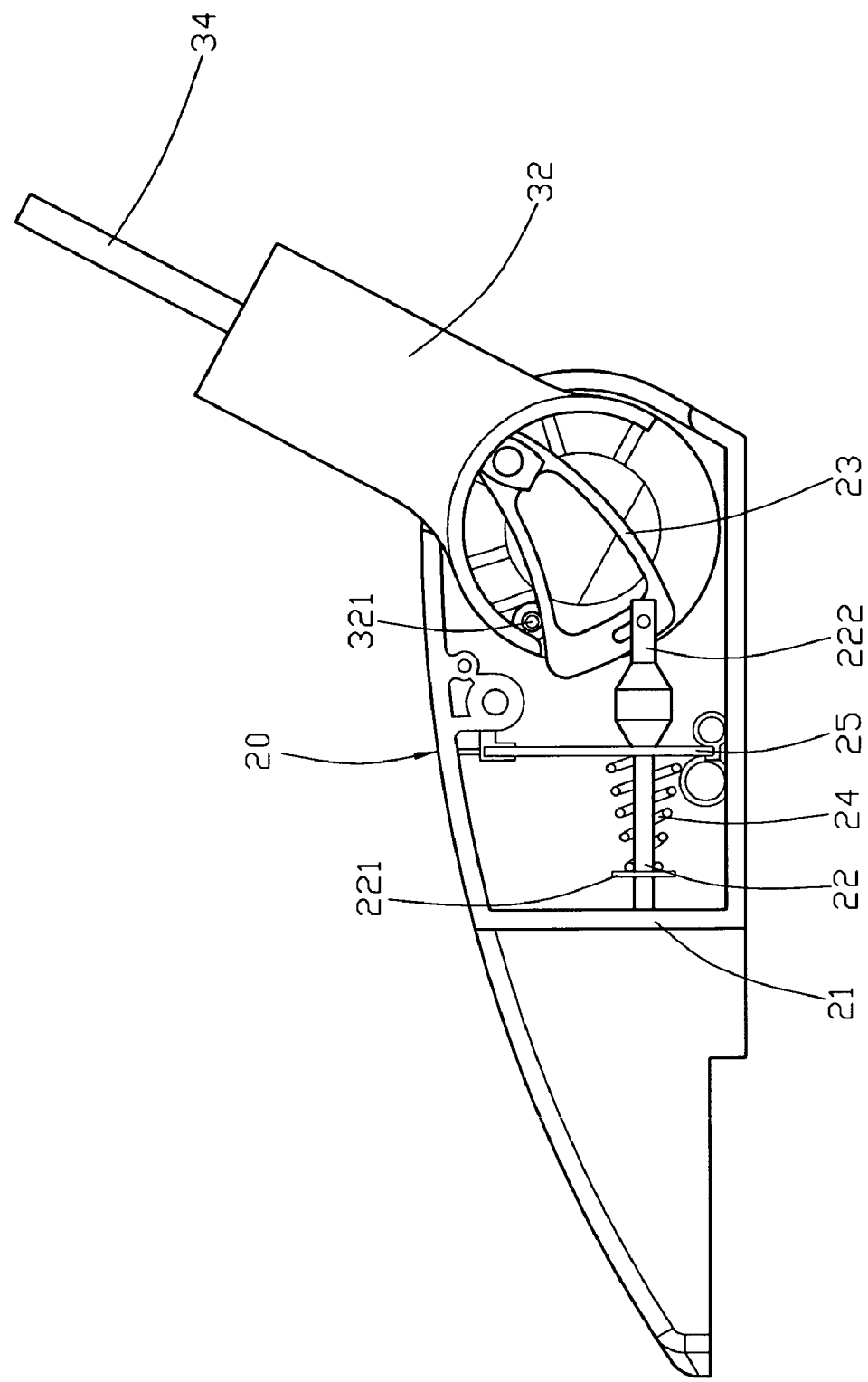
FIG. 5 is a broken plan view of the gardening shears as shown in FIG. 2.
Figure 6:
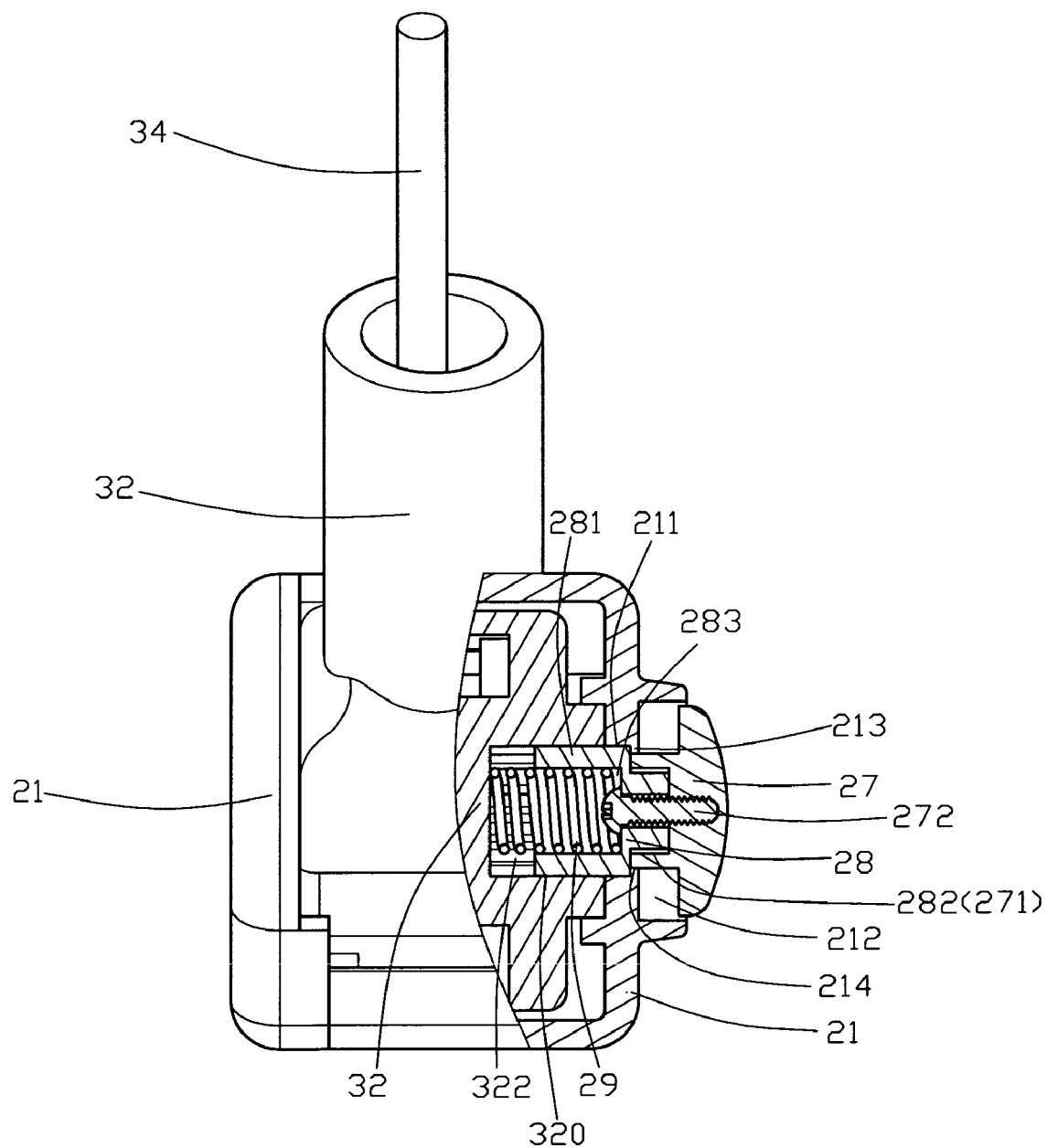
FIG. 6 is a partially plan cross-sectional view of the gardening shears as shown in FIG. 2.
Figure 7:
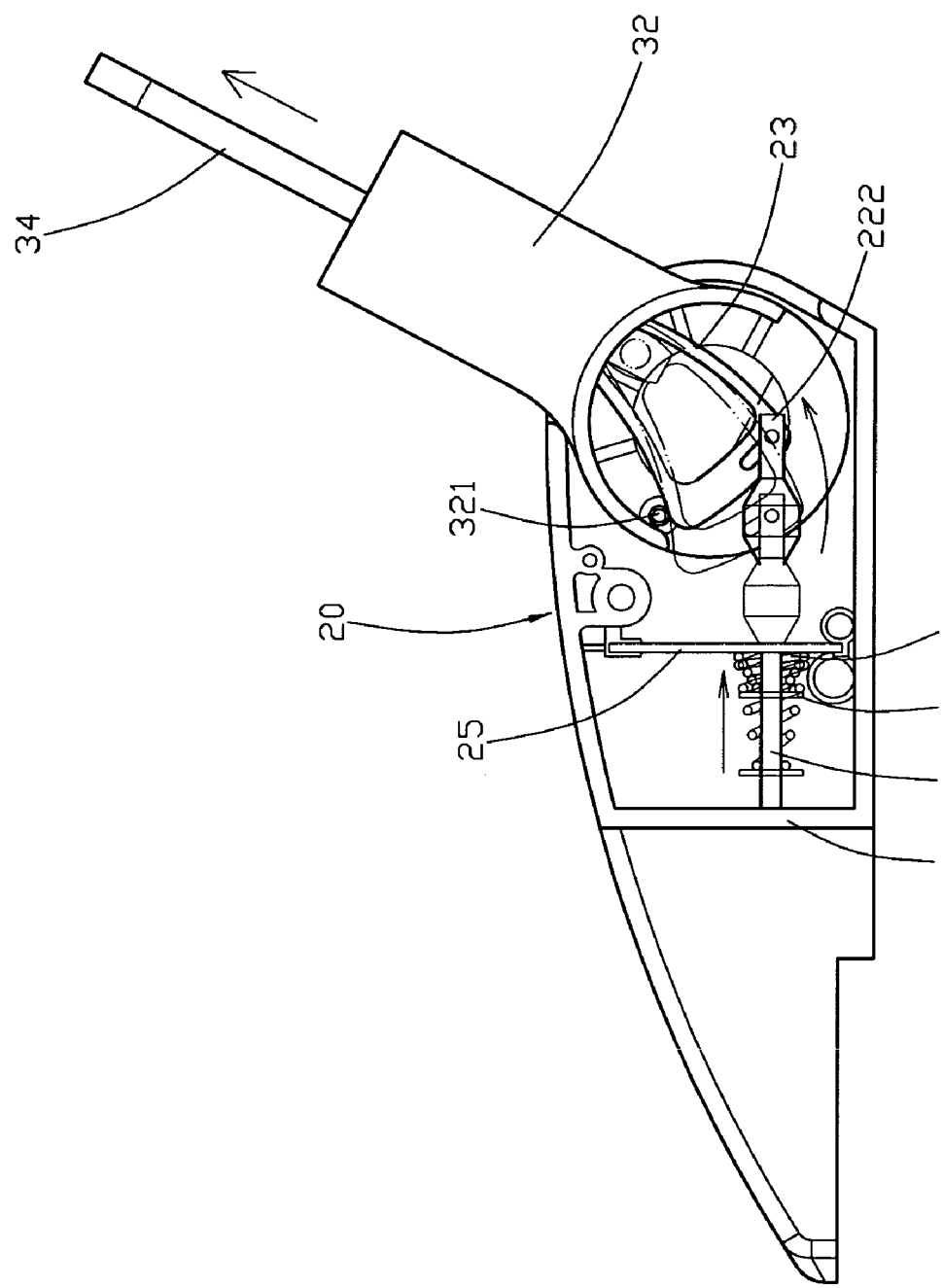
FIG. 7 is a schematic operational view of the gardening shears as shown in FIG. 5.

In operation, referring to FIGS. 1-7, when the control lever 31 is pressed, the drive member 34 is pulled upward to pull the pivot plate 23 which pulls the link 22 backward as shown in FIG. 7 to move one of the cutting blades 10 so as to close the cutting blades 10. At this time, the catch flange 221 is moved backward with the link 22 to compress the restoring member 24 between the catch flange 221 and the catch plate 25 so that the restoring member 24 stores a restoring force. After the force applied on the control lever 31 is removed, the catch flange 221 is moved forward by the restoring force of the restoring member 24 to move the link 22 forward to return to the original state as shown in FIG. 5 to move one of the cutting blades 10 so as to open the cutting blades 10 again.

Figure 8:
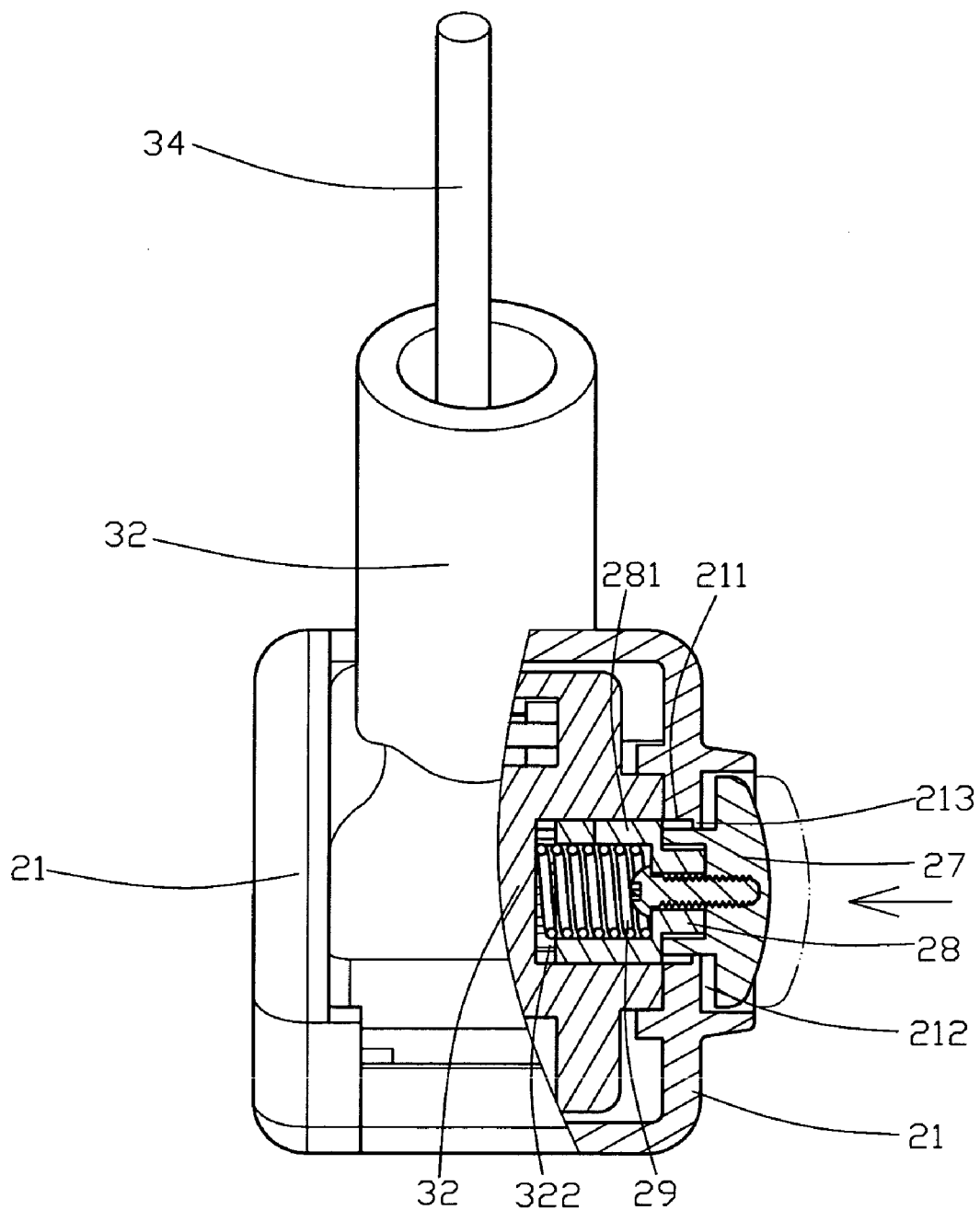
FIG. 8 is a schematic operational view of the gardening shears as shown in FIG. 6.
Figure 9:
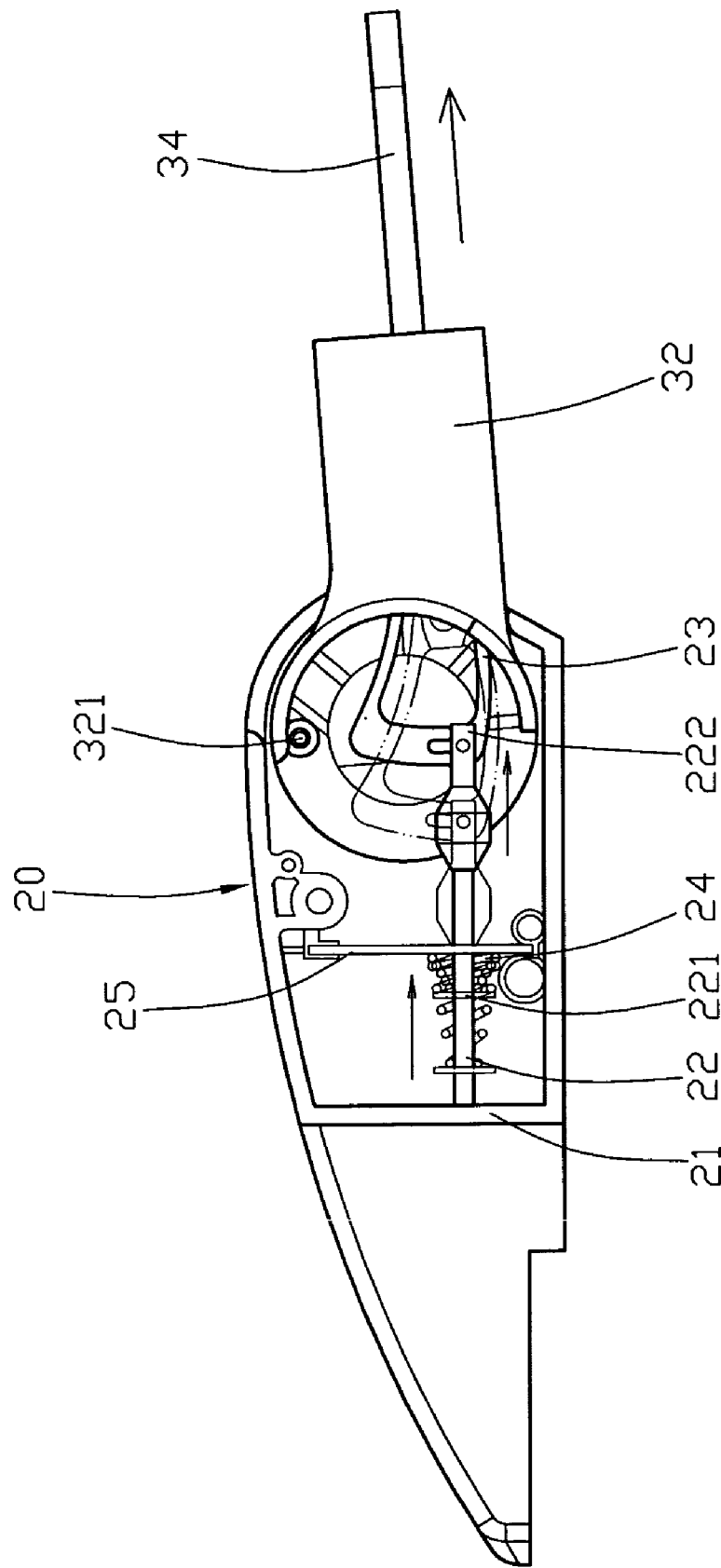
FIG. 9 is a schematic operational view of the gardening shears as shown in FIG. 5.
Figure 10:
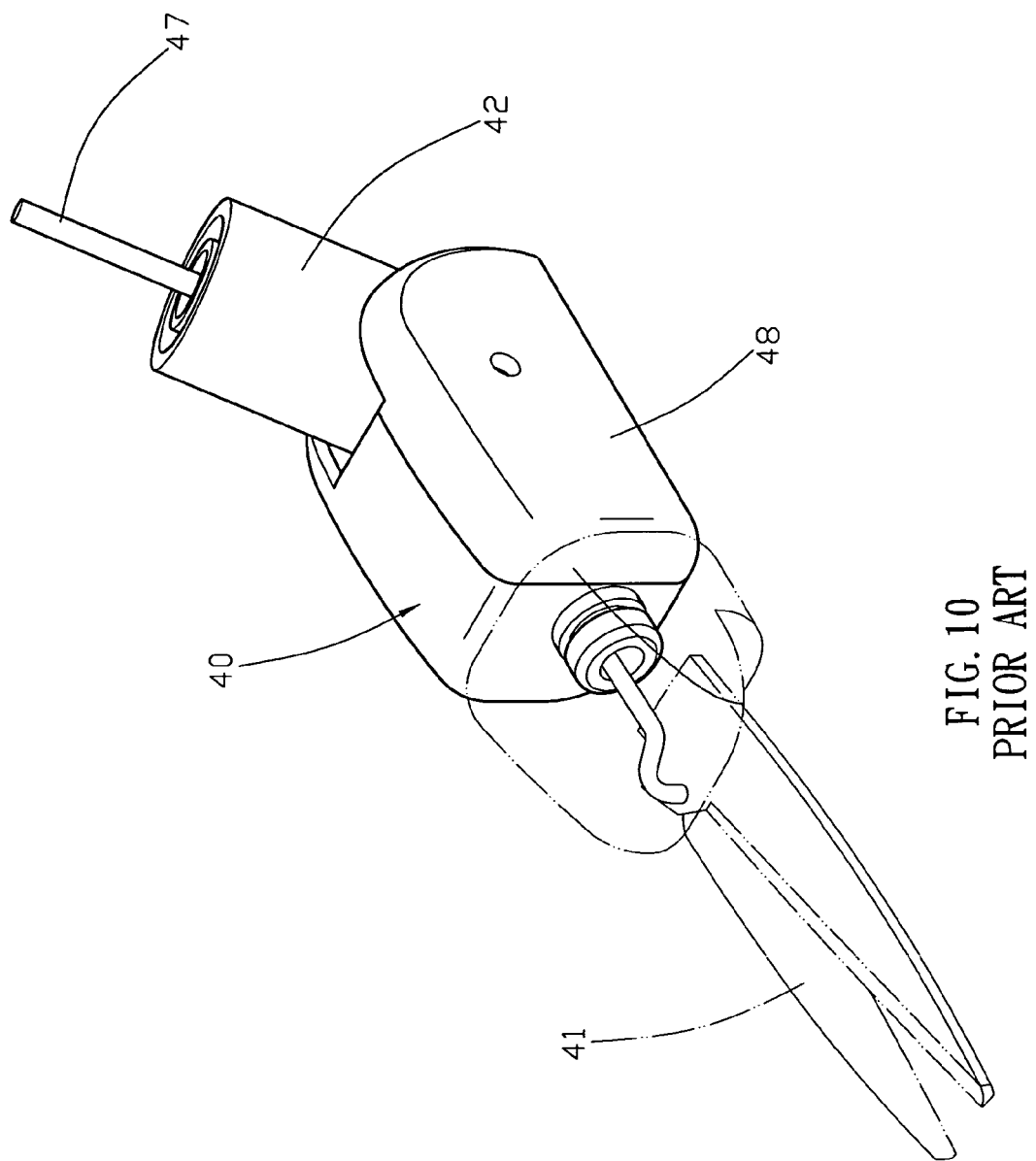
FIG. 10 is a perspective view of a pair of conventional gardening shears in accordance with the prior art.
Figure 11:
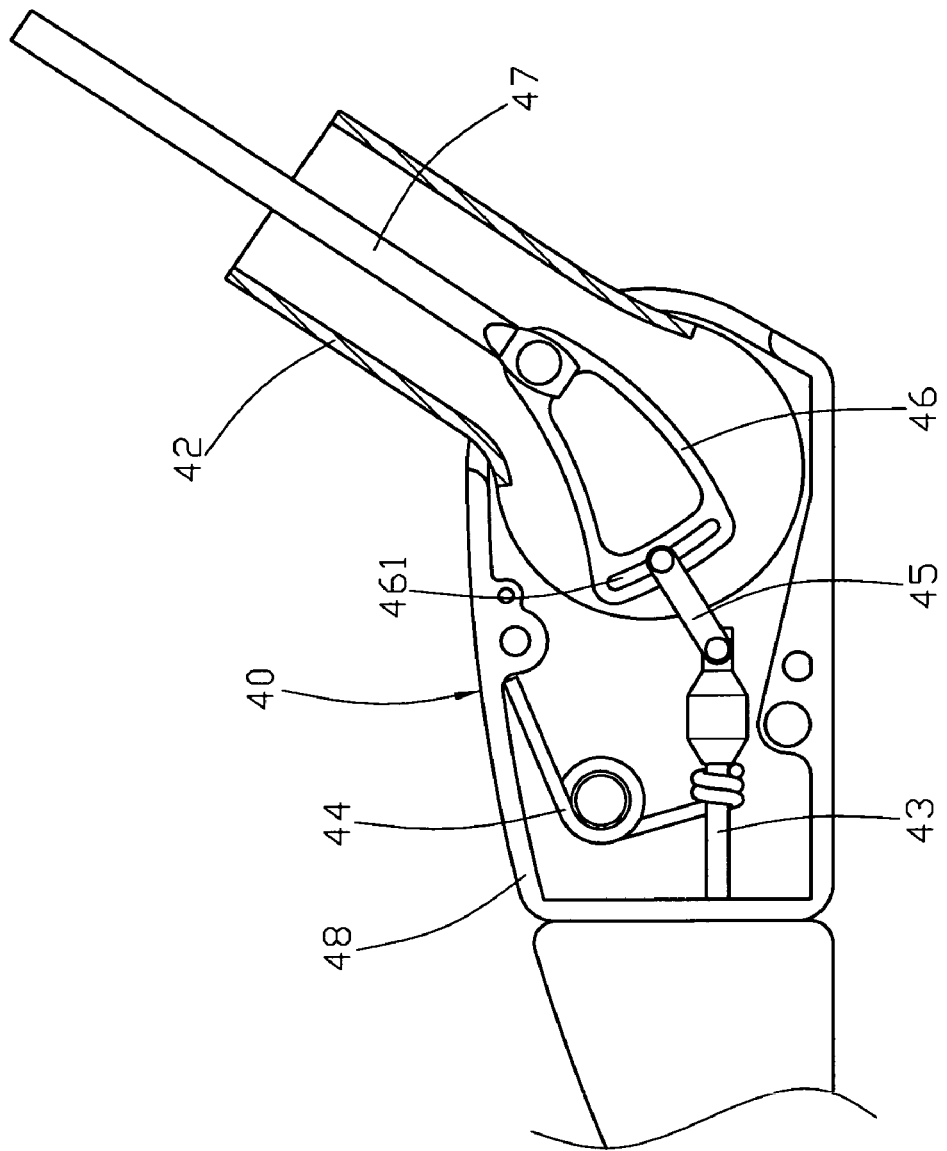
FIG. 11 is a broken plan view of the conventional gardening shears as shown in FIG. 10.

In adjustment, referring to FIGS. 1-9, when the press button 27 is pressed toward the locking member 28 as shown in FIG. 8, the locking member 28 is pushed by the press button 27 to move away from the receiving hole 214 of the housing 21 to detach the locking teeth 281 of the locking member 28 from the locking slots 211 of the housing 21 to release the locking member 28 from the housing 21 and to release the pivot head 32 of the handle 30 from the housing 21, so that the pivot head 32 of the handle 30 is rotatable freely relative to the housing 21 from the position as shown in FIG. 5 to the position as shown in FIG. 9 so as to adjust the inclined angle between the pivot head 32 of the handle 30 and the housing 21.

After the force applied on the press button 27 is removed, the locking member 28 is moved toward the receiving hole 214 of the housing 21, so that the locking teeth 281 of the locking member 28 is locked in the locking slots 211 of the housing 21 as shown in FIG. 6 to lock the locking member 28 and the pivot head 32 of the handle 30 onto the housing 21 again.

As shown in FIGS. 5 and 9, when the pivot head 32 of the handle 30 is rotatable upward relative to the housing 21 from the position as shown in FIG. 9 to the position as shown in FIG. 5, the stop post 321 of the pivot head 32 is movable to rest on the pivot plate 23 to prevent the pivot plate 23 from directly rubbing an inner wall of the pivot head 32.

Accordingly, the restoring member 24 is biased between the catch flange 221 and the catch plate 25, so that the restoring member 24 is not subjected to a pulling force to prevent the restoring member 24 from being worn out by a pulling force during a long-term utilization, thereby enhancing the lifetime of the restoring member 24. In addition, a user only needs to press the press button 27 so as to adjust the angle between the pivot head 32 of the handle 30 and the housing 21, thereby facilitating the user adjusting the inclined angle of the pivot head 32 of the handle 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of gardening shears, comprising:
   a handle having a lower end provided with a pivot head;
   a drive member mounted in the handle;
   a control lever pivotally mounted on an upper end of the handle and connected to an upper end of the drive member to drive the drive member;

a transmission device mounted on the pivot head of the handle;

two cutting blades pivotally mounted on the transmission device and driven by the drive member via the transmission device;

the transmission device including:

a housing on which the pivot head of the handle is pivotally mounted;

a pivot plate mounted in the housing and having a first end pivotally mounted on a lower end of the drive member to move therewith;

a catch plate mounted in the housing;

a link movably mounted in the housing and having a first end pivotally mounted on a second end of the pivot plate to move therewith and a second end protruded outwardly from the housing and pivotally mounted on one of the cutting blades;

a catch flange mounted on the link;

a restoring member mounted on the link and biased between the catch flange and the catch plate; wherein the pivot head of the handle has an outer wall provided with a receiving recess having a periphery formed with a plurality of tooth-shaped locking grooves;

the housing has a side wall formed with a receiving hole having a periphery formed with a plurality of tooth-shaped locking slots;

the transmission device further includes a locking member movably mounted between the pivot head of the handle and the housing and having a periphery formed with a plurality of locking teeth which are locked in the locking grooves of the pivot head and are detachably locked in the locking slots of the housing to lock the pivot head onto the housing, an elastic member mounted between the pivot head of the handle and the locking member to push the locking member toward the locking slots of the housing, and a press button movably mounted on the housing and connected to the locking member to push the locking member to detach from the locking slots of the housing.

2. The gardening shears in accordance with claim 1, wherein the catch plate is located between the catch flange and the pivot plate.

3. The gardening shears in accordance with claim 1, wherein the catch plate has an inside formed with an opening to allow passage of the first end of the link.

4. The gardening shears in accordance with claim 1, wherein the restoring member pushes the link to move toward the cutting blades and away from the pivot plate.

5. The gardening shears in accordance with claim 1, wherein the pivot head of the handle is located at a first end of the housing, and the cutting blades are located at a second end of the housing.

6. The gardening shears in accordance with claim 1, wherein the pivot head of the handle has an inner wall provided with a protruding stop post, and the pivot plate is movable to rest on the stop post of the pivot head.

7. The gardening shears in accordance with claim 1, wherein the pivot plate is pivotally mounted in the pivot head of the handle.

8. The gardening shears in accordance with claim 1, wherein the receiving hole of the housing has a stepped shape.

9. The gardening shears in accordance with claim 1, wherein the receiving hole of the housing has an inner side formed with the locking slots and an outer side formed with a radially and inwardly extending annular stop flange.

10. The gardening shears in accordance with claim 9, wherein the locking member is received in the receiving hole of the housing and stopped by the stop flange of the housing.

11. The gardening shears in accordance with claim 1, wherein the side wall of the housing has an outer side formed with an outwardly extending annular enclosure surrounding the locking slots, and the press button is movably mounted in the enclosure of the housing.

12. The gardening shears in accordance with claim 1, wherein the locking member has a first side formed with a receiving chamber to receive the elastic member.

13. The gardening shears in accordance with claim 12, wherein the elastic member is partially received in the receiving recess of the pivot head.

14. The gardening shears in accordance with claim 12, wherein the locking member has a second side formed with a protruding mounting post protruded outwardly from the receiving hole of the housing, and the press button has a side formed with a protruding mounting sleeve mounted on the mounting post of the locking member.

15. The gardening shears in accordance with claim 14, wherein the mounting sleeve of the press button is movable in the receiving hole of the housing.

16. The gardening shears in accordance with claim 1, wherein the press button and the locking member are pushed by the elastic member to move outwardly relative to the housing so that the locking teeth of the locking member is locked in the locking slots of the housing at a normal state.

17. The gardening shears in accordance with claim 1, wherein the transmission device further includes a locking screw extended through the receiving chamber and the mounting post of the locking member and screwed into the press button to attach the press button onto the locking member.

18. The gardening shears in accordance with claim 1, wherein when the press button is pressed toward the locking member, the locking member is pushed by the press button to move away from the receiving hole of the housing to detach the locking teeth of the locking member from the locking slots of the housing to release the locking member from the housing and to release the pivot head of the handle from the housing, so that the pivot head of the handle is rotatable relative to the housing.

19. The gardening shears in accordance with claim 6, wherein when the pivot head of the handle is rotatable upward relative to the housing, the stop post of the pivot head is movable to rest on the pivot plate.

* * * * *